(12) United States Patent
Guzowski (10) Patent No.: US 9,085,101 B2
(45) Date of Patent: Jul. 21, 2015

(54) METHOD FOR MANUFACTURING A GASKET WITH AN ENCAPSULATED METAL BAND

(75) Inventor: Samuel Guzowski, San Jose (CR)

(73) Assignee: Max Seal, Inc., San Diego, CA (US)

( * ) Notice: Subject to any disclaimer, the term of this patent is extended or adjusted under 35 U.S.C. 154(b) by 276 days.

(21) Appl. No.: 12/807,233

(22) Filed: Sep. 1, 2010

(65) Prior Publication Data
US 2012/0049409 A1    Mar. 1, 2012

(51) Int. Cl.
| | |
|---|---|
| *B29C 45/14* | (2006.01) |
| *F16J 15/12* | (2006.01) |
| *F16L 21/03* | (2006.01) |
| *B29L 31/26* | (2006.01) |

(52) U.S. Cl.
CPC ....... *B29C 45/14065* (2013.01); *B29C 45/1459* (2013.01); *F16J 15/121* (2013.01); *F16L 21/03* (2013.01); *B29C 45/14819* (2013.01); *B29C 2045/14122* (2013.01); *B29C 2045/14131* (2013.01); *B29L 2031/265* (2013.01)

(58) Field of Classification Search
CPC ..................... B29C 45/14819; B29C 45/1459; B29C 45/14065; B29C 2045/14122; B29C 2045/14614; B29C 70/70
USPC ......... 264/279.1, 273, 274, 275, 278
See application file for complete search history.

(56) References Cited

U.S. PATENT DOCUMENTS

| | | | |
|---|---|---|---|
| 1,924,020 A | | 8/1933 | Bihet |
| 2,319,607 A | * | 5/1943 | Kevorkian et al. .............. 30/345 |
| 2,726,441 A | * | 12/1955 | Brody ................................. 30/30 |
| 2,730,116 A | | 1/1956 | Rickard |
| 2,967,067 A | | 1/1961 | Singer |
| 3,182,119 A | * | 5/1965 | Millard .......................... 174/151 |
| 3,182,120 A | * | 5/1965 | Duhn ............................. 174/151 |
| 3,211,472 A | | 10/1965 | Rickard |
| 3,222,091 A | | 12/1965 | Marshall |
| 3,458,373 A | * | 7/1969 | Weinbrenner et al. ......... 156/125 |
| 3,480,300 A | | 11/1969 | Jeffery et al. |
| 3,698,744 A | | 10/1972 | Bevington |
| 3,884,510 A | | 5/1975 | Bram |
| 4,120,521 A | | 10/1978 | Parmann |
| 4,124,676 A | * | 11/1978 | Henzl ............................ 264/250 |
| 4,127,290 A | | 11/1978 | Mutschlechner |
| 4,310,184 A | | 1/1982 | Campbell |
| 4,343,754 A | * | 8/1982 | Wilde et al. .................... 264/154 |
| 4,552,385 A | | 11/1985 | Peting |
| 4,648,633 A | | 3/1987 | Bergmann |
| 5,139,290 A | | 8/1992 | Shafer |
| 5,197,768 A | | 3/1993 | Conner |
| 5,213,749 A | * | 5/1993 | Huss et al. ..................... 264/275 |
| 5,303,937 A | * | 4/1994 | Huss et al. ..................... 277/500 |
| 5,660,447 A | * | 8/1997 | Angelici ......................... 301/5.7 |
| 6,113,159 A | | 9/2000 | Corbett, Jr. |

(Continued)

*Primary Examiner* — Edmund Lee
(74) *Attorney, Agent, or Firm* — Knobbe Martens Olson & Bear LLP (57) ABSTRACT

A method for manufacturing a gasket that is reinforced by a metal band, which is completely encapsulated within the elastomeric material of the gasket. The metal band is formed with spaced-apart dimples stamped into its inner surface, causing raised projections to form on the outer surface of the metal band. When the metal band is placed in a mold, the raised projections on its outer surface cause the metal band to be spaced apart from the inner wall of the mold. Elastomeric material is then injected into the mold and is able to completely encapsulate the metal band. The gasket is cured and then removed from the mold.

6 Claims, 8 Drawing Sheets

(56) References Cited

U.S. PATENT DOCUMENTS

| | | |
|---|---|---|
| 6,145,895 A | 11/2000 | Patel |
| 6,179,346 B1 | 1/2001 | Robson |
| 6,482,140 B1 * | 11/2002 | Takatsu .......................... 492/31 |
| 6,503,435 B1 * | 1/2003 | Mockenhaupt et al. ...... 264/274 |
| 6,533,332 B2 | 3/2003 | Vitel et al. |
| 6,945,570 B2 | 9/2005 | Jones |
| 7,125,054 B2 | 10/2006 | Jones |
| 7,284,310 B2 | 10/2007 | Jones et al. |
| 2002/0163195 A1 | 11/2002 | Vitel et al. |
| 2005/0046189 A1 | 3/2005 | Corbett et al. |
| 2009/0200705 A1 | 8/2009 | Mora |
| 2010/0025982 A1 | 2/2010 | Jamison |

* cited by examiner

METHOD FOR MANUFACTURING A GASKET WITH AN ENCAPSULATED METAL BAND

FIELD OF THE INVENTION

The present invention relates to manufacturing an improved reinforced gasket for sealing pipe joints.

BACKGROUND OF THE INVENTION

Pipelines for conveying fluids can be made from a number of different materials, including plastic materials, such as polyvinyl chloride (PVC), and metals, such as steel, brass and aluminum. Each length of such pipe typically has a belled female end and a spigot male end. The joints between sections of pipe are sealed, typically with a gasket. PVC pipe systems have often relied on the "Rieber Joint," which was developed in the early 1970's by Rieber & Son of Bergen, Norway, to seal the connections. The Rieber Joint has an elastomeric gasket inserted into a groove on the inside of the belled end of a piece of the PVC pipe as the female end is being formed.

It soon became apparent that gaskets made entirely from elastomeric materials were unsuitable for pressure applications. The obvious solution was incorporating a metal ring or band embedded in the elastomeric body. The metal ring or band would secure the position of the gasket during the belling process; retain the gasket in the annular groove of the belled pipe while the pipe joint was assembled; and prevent extrusion of the gasket during pressure testing and pressure surges under operating conditions.

Figure 1:
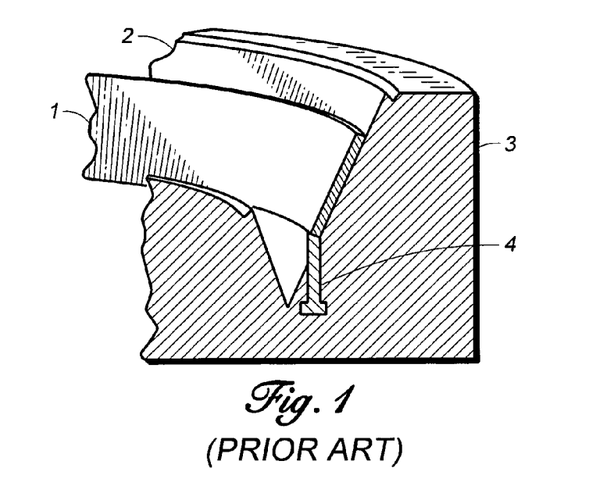
FIG. 1 is a partial sectional view showing a metal band set in the cavity of a mold, the lower edge of the band resting on supporting pins.
Figure 2:
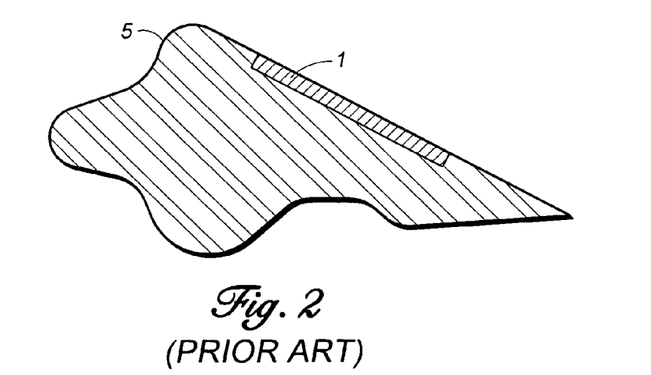
FIG. 2 is a sectional view of a reinforced gasket produced by using the mold shown in FIG. 1.

The choice of using a metal ring or flat, hoop-shaped metal band depended on the application of the gasket. The metal ring would typically be completely embedded within the body of the gasket during the injection molding process. A metal band was typically only partially embedded in the elastomeric body of a gasket. As shown in prior art FIG. 1, the flat metal band 1 would be placed as an insert against the cavity wall 2 of the lower mold plate 3 of a mold, with its lower edge resting against the top of core support pin(s) 4, which were circumferentially spaced around the bottom of the cavity wall 2. Elastomeric material would be injected and molded, resulting in a reinforced gasket 5, such as that shown in prior art FIG. 2. U.S. Pat. No. 4,120,521 to Parmann shows a typical gasket produced by the method. The metal band 1 would have an entire face left exposed to the elements and contaminants, which could corrode or degrade the metal band 1. Such a possibility was of concern during storage and during use of the gasket 5 in a pipeline joint.

Figure 3:
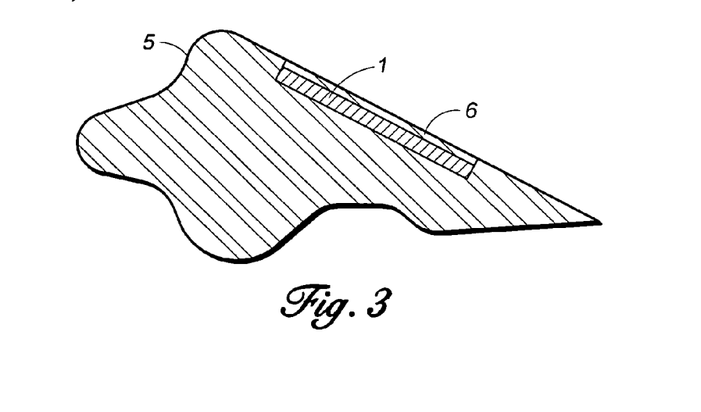
FIG. 3 is a sectional view of an alternate reinforced gasket.

Embedding the metal band 1 completely within the elastomeric material is clearly desirable in order to improve corrosion resistance. One approach has been to cover the exposed face of the metal band 1 with a thin rubber layer 6 after molding, as shown in prior art FIG. 3. However, because the rubber layer 6 was not molded with the gasket 5, it tended to peel away when the gasket was being installed during belling of the pipe, or during operation of the joint, thus defeating its purpose.

Another approach is shown in U.S. Pat. No. 6,113,159 to Corbett, Jr., which shows a gasket reinforced with a metal band having a circumferential apex. The patent does not disclose how the band is made, nor how the gasket is molded, but the gasket is not currently being manufactured. In any event, after molding, the apex of the metal band is exposed around the outer circumference of the gasket, leading to the same problems described, supra.

Figure 4:
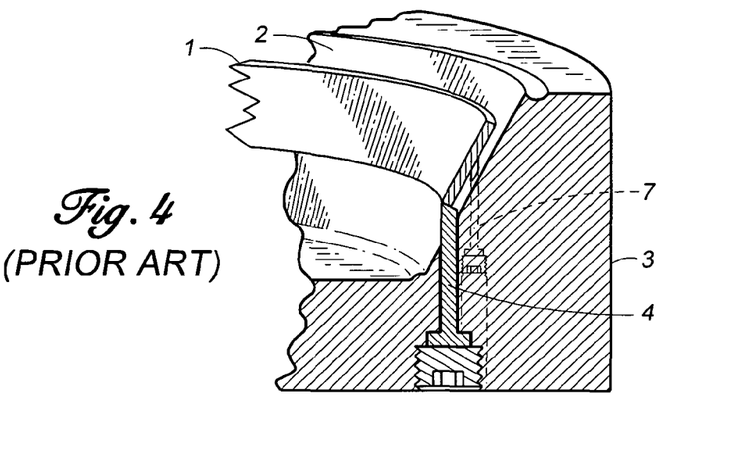
FIG. 4 is a partial sectional view showing a metal band set in the cavity of a mold, the band spaced away from the cavity wall by axial support pins.
Figure 5:
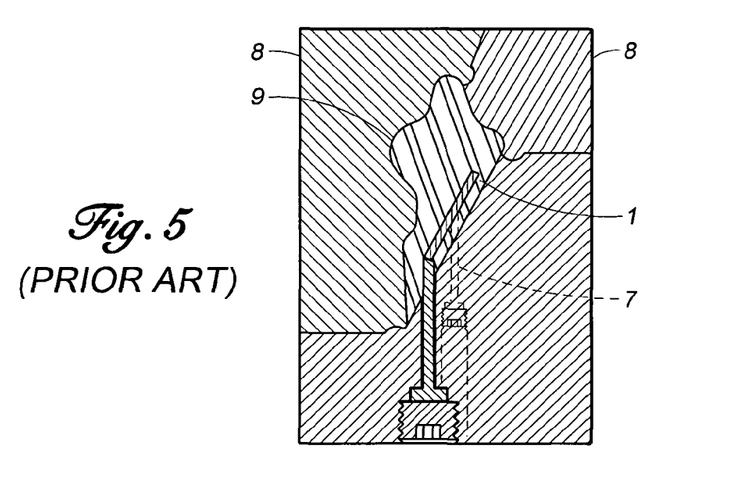
FIG. 5 is a sectional view of the mold of FIG. 4 showing the shape of the reinforced gasket produced therein.
Figure 6:
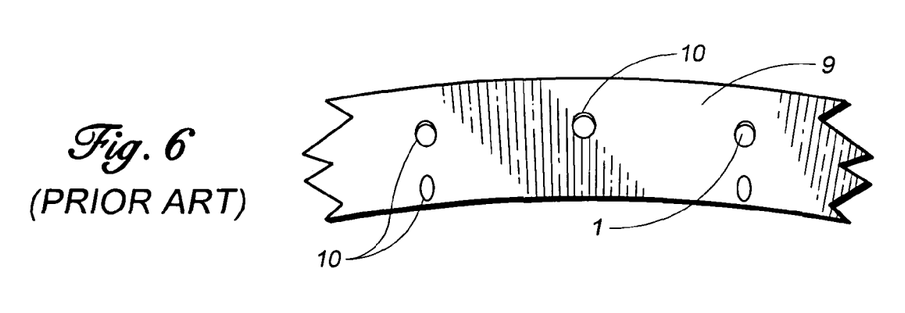
FIG. 6 is a plan view showing the indentations in the rubber surface of a gasket molded using the mold shown in FIGS. 4 and 5.
Figure 7:
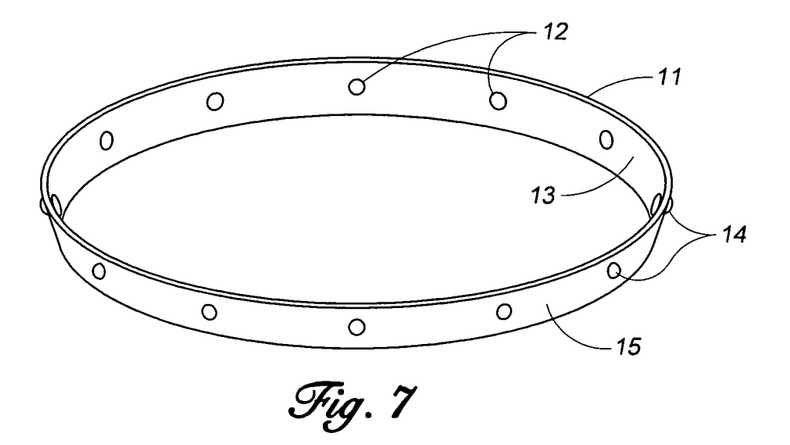
FIG. 7 is a perspective view of the reinforcing metal band of the present invention, showing the raised projections on its outer surface.

Yet another approach is shown in prior art FIGS. 4 and 5. It is known in the art of injection molding to use inserts, which can be molded into an elastomeric material. The inserts are supported by support pins having different geometries and positions, depending on the desired final position of the insert after the molding process is completed. For example, FIG. 4 is similar to FIG. 1, showing a metal band 1 with its lower edge resting against the top of core support pins 4. The outer face of the metal band 1 is spaced slightly apart from the cavity wall 2 of the lower mold plate 3 by axial support pins 7. Alternatively, radial support pins (not shown) could be used. Both types of support pins are known as lateral positioning pins. As shown in FIG. 5, the upper mold plates 8 have been put in place, and the injection molding process had produced a gasket 9 with the metal band 1 embedded therein to a significant degree. This method, which is described in U.S. Patent Publication No. 2009/0200705 A1 to Mora, is well known in the art. While the resulting gasket 9 is an improvement over a gasket with an exposed face, the metal band 1 is not entirely encapsulated. As shown in FIG. 6, the ends of the axial pins leave small indentations 10 in the surface of the body of the gasket 9, exposing a significant portion of the metal band 1 to corrosion. Further, the additional axial support pins 7 used means that more care is required when the metal band 1 is inserted, and the number of pins that could break or deteriorate during the molding process is increased.

There exists a need for an improved gasket with an encapsulated metal band, as well as a method for molding such a reinforced gasket.

SUMMARY OF THE INVENTION

The present invention uses a rigid band, which can be formed from a metal such as steel, copper, or brass. It is shaped so that it can be completely encapsulated within elastomeric material during the molding process. Because no radial or axial support pins are used, the gasket formed around the metal band has no indentations from those pins, and the metal band has no areas exposed to the elements.

The metal band of the present invention incorporates a lateral support system in the form of circumferentially-spaced raised projections. Dimples are stamped into the inner surface of the band, forming raised projections on the outer surface of the metal band. These projections cause the metal band to be positively separated from the cavity wall of the mold when the metal band is positioned therein. As a result, the diameter of the metal band used is decreased, reducing the amount of metal used in making the reinforcing band for a gasket.

The mold used to make the gasket is greatly simplified, without the need for radial or axial support pins requiring adjustment and maintenance. With fewer pins, the mold is easier to clean. Further, its raised projections allow the metal band to be positioned easily and accurately within the cavity, reducing accidental displacement during mold closure, thus decreasing mold damage and the production of defective gaskets.

Because the raised projections are an integral part of the metal band, complete encapsulation of the metal band is accomplished. Further, the shape of the projections increases the contact area of the metal band, improving adhesion of the elastomer to the metal band.

The metal band can be stamped with dimples in different patterns around the circumference of the metal band; for instance, a metal band with a large diameter may be stamped to form raised projections in patterns that improve positioning of the metal band in the mold cavity.

It is an object of the present invention to provide a gasket with a metal band that is entirely encapsulated within elastomeric material.

Another object of the present invention is to provide a cured reinforced gasket with an encapsulated band that is isolated from exposure to liquids or contaminants.

Yet another object of the present invention is to provide a metal band with raised projections that support the metal band and space it away from the mold cavity wall during the molding process.

BRIEF DESCRIPTION OF THE DRAWINGS

FIGS. 1 through 6 are related to the prior art.

FIGS. 15-18 show the steps of the stamping process for dimpling the metal band of the present invention.

DESCRIPTION OF THE PREFERRED EMBODIMENT

The present invention uses a slightly conical, hoop-shaped metal band 11, which has a pattern of dimples 12 formed in the inner surface 13 of the metal band 11, each dimple 12 forming a raised projection 14 on the outer face 15 of the metal band 11. The metal used to form the band 11 is typically steel which can be stamped in a die. The band can also be made from copper, brass, or another metal. The process for making the metal band 11 from steel is described in FIGS. 14A-C through FIG. 18, infra.

Figure 8:
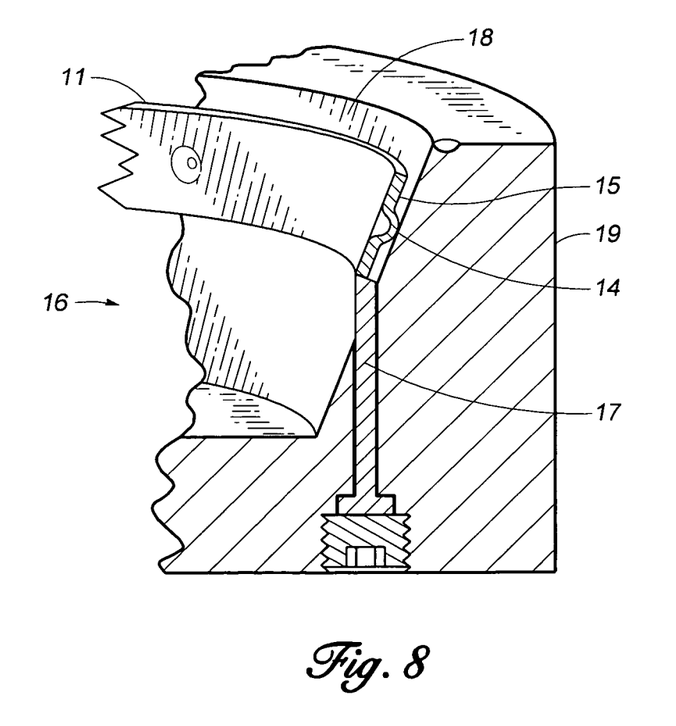
FIG. 8 is a partial sectional view showing the placement of the metal band of the present invention in the cavity of a mold.

A gasket produced by injection molding can be reinforced using the metal band 11 of the present invention. As shown in FIG. 8, the metal band 11 is placed in the injection mold 16, with its lower edge resting against the tops of core support pins 17. The outer face 15 of the metal band 11 is spaced apart from the cavity wall 18 of the lower mold plate 19 by the raised projections 14 on the outer face 15 of the metal band 11.

Figure 9:
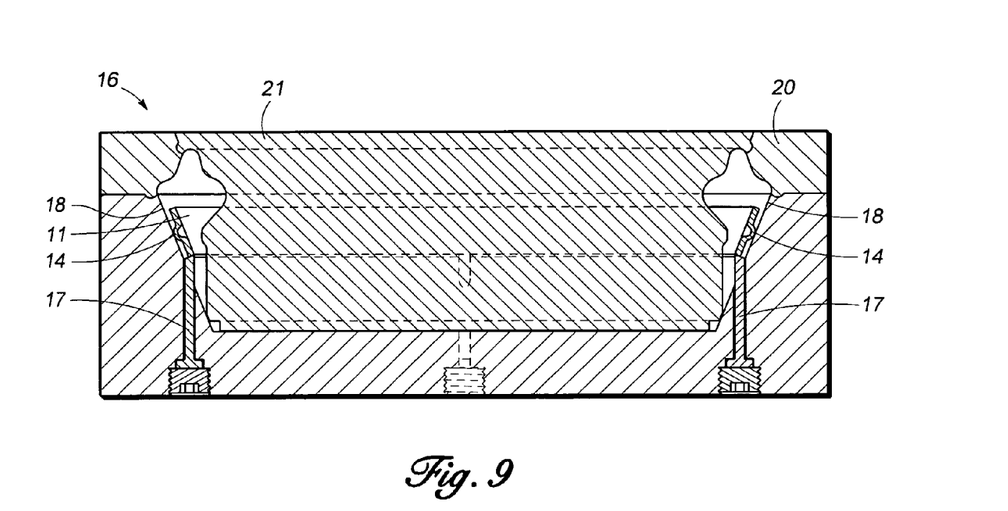
FIG. 9 is a cross-sectional view of the mold holding the reinforcing metal band in place, with the upper plates closed.

As shown in FIG. 9, the upper mold plates 20, 21, have been put in place. Core support pins 17, arranged and spaced apart around the circumference of the cavity in the injection mold 16, support the lower edge of the metal band 11, while the raised projections 14 space the outer face 15 of the metal band 11 away from the cavity wall 18. No axial or lateral support pins are used. The mold 16 is ready for injection of the elastomer material for forming a gasket. The elastomer material used is typically a synthetic or natural rubber, a thermoplastic, or similar material.

Figure 10:
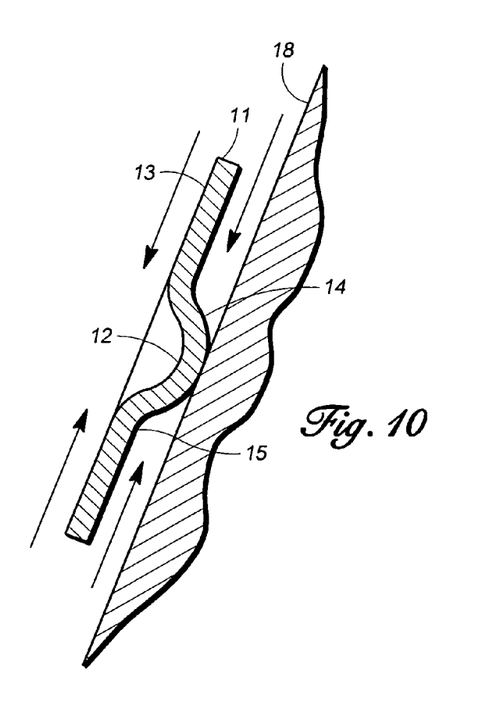
FIG. 10 is a detail drawing of one of the raised projections of the metal band spaced away from the cavity wall of the mold, showing the flow of elastomeric material around the metal band during the molding process.

FIG. 10 shows the flow of elastomer material around the metal band 11 during the injection molding process. Because the metal band 11 is spaced apart from the cavity wall 18, the elastomer can coat both the inner surface 13 of the metal band 11 and the outer face 15 of the metal band 11, completely encapsulating the metal band 11, the dimples 12, and the raised projections 14.

Figure 11:
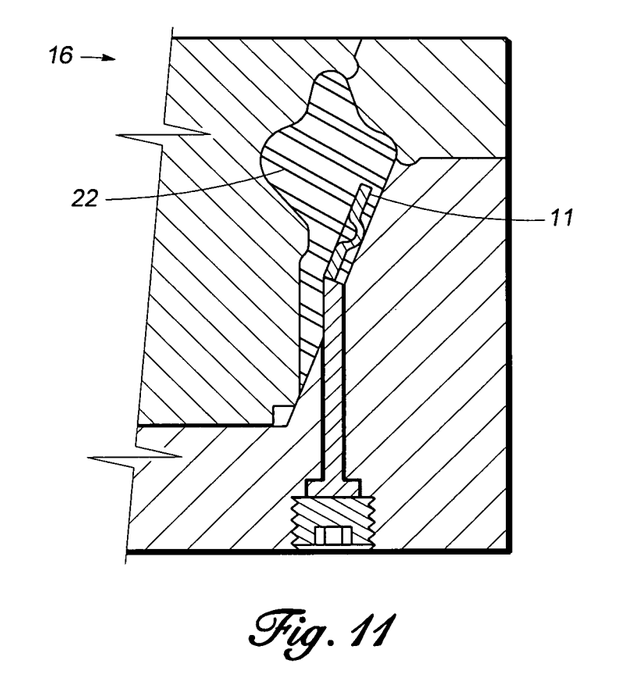
FIG. 11 is a sectional view of a portion of the mold showing the position of the metal band as it is encapsulated within the gasket during the molding process.

FIG. 11 shows the reinforced gasket 22 produced by the process described herein. After injection molding and curing have been completed, the unique metal band 11 is completely encapsulated within the gasket 22.

Figure 12:
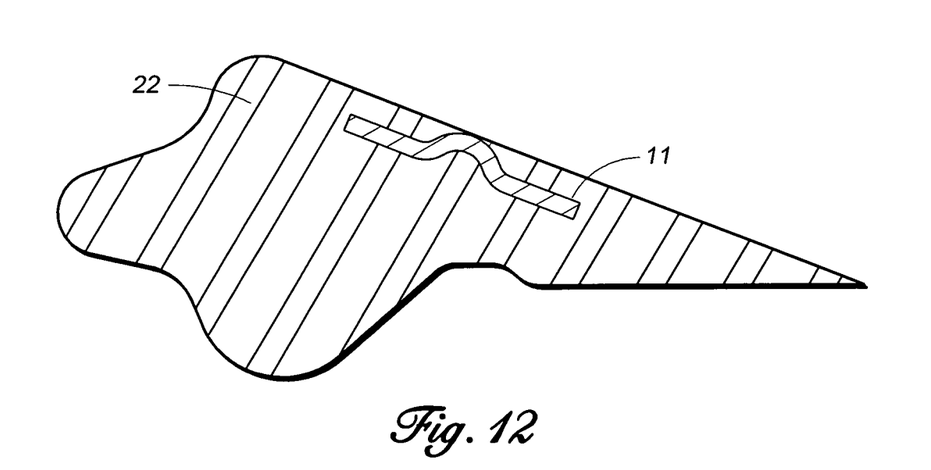
FIG. 12 is a sectional view of one of the dimples in the metal band, which has been encapsulated within the molded gasket.

FIG. 12 shows a cross-sectional view of the cured reinforced gasket 22 after it has been removed from the mold 16. The metal band 11 is completely encapsulated within the gasket 21.

Overall, the present invention reduces the number of support pins required to properly position the metal band 11 so that it is encapsulated in the gasket 22 during the molding process. This simplifies the construction of the injection mold 16 used; simplifies the maintenance of the mold 16, making it easier to clean; reduces the number of pins that can break or deteriorate during the molding process since no axial or radial pins are used; facilitates loading the metal band 11 into the cavity of the injection mold 16 since there is no need to align the metal band 11 with the axial or radial pins; and reduces the amount of exposed metal in the band 11 by at least thirty-five percent (35%). The metal band 11 also requires less material because the circumference of the band used is smaller than the circumference of the gasket in which it will be encapsulated.

Figure 13:
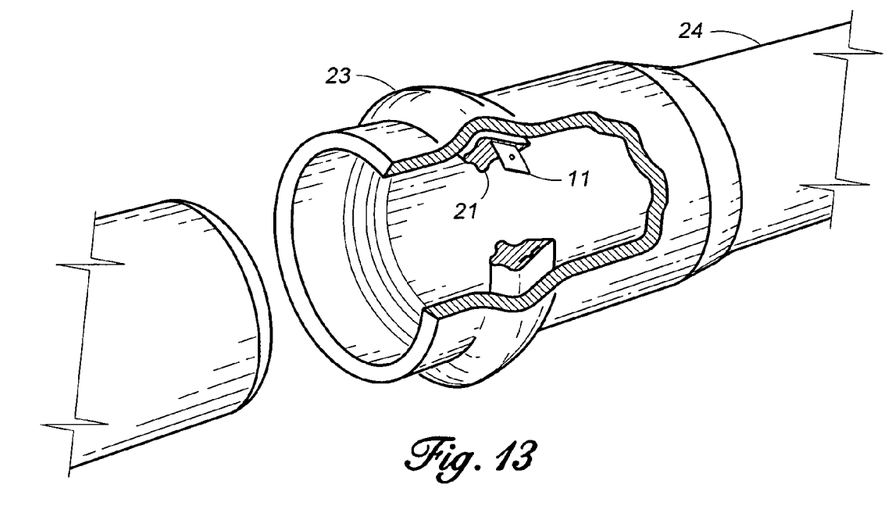
FIG. 13 shows the reinforced gasket installed inside the belled end of a female pipe.

As shown in FIG. 13, the reinforced gasket 22 of the present invention has been installed in the belled end 23 of a female pipe 24. Because the metal band 11 is completely encapsulated by the elastomeric material, it will not be subject to corrosion or other processes causing deterioration.

Figure 14A:
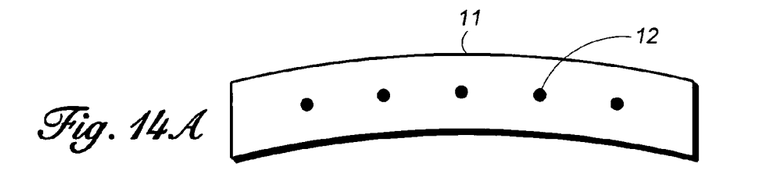
FIGS. 14A-14C show alternate dimpling patterns in the inner surface the metal band of the present invention.
Figure 14B:
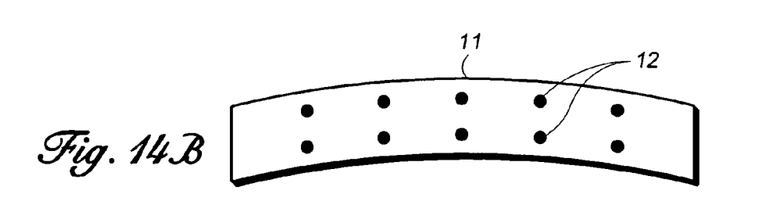
Figure 14C:
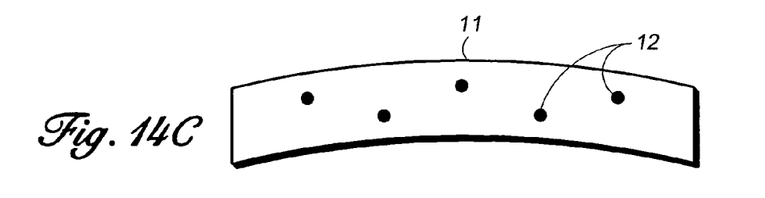

The metal band 11 of the present invention can have dimples 12 formed in different patterns of choice, with examples shown in FIGS. 14A through 14C, depending on the size of the metal band and the geometries of the injection mold, which may affect positioning of the metal band 11.

Figure 15:
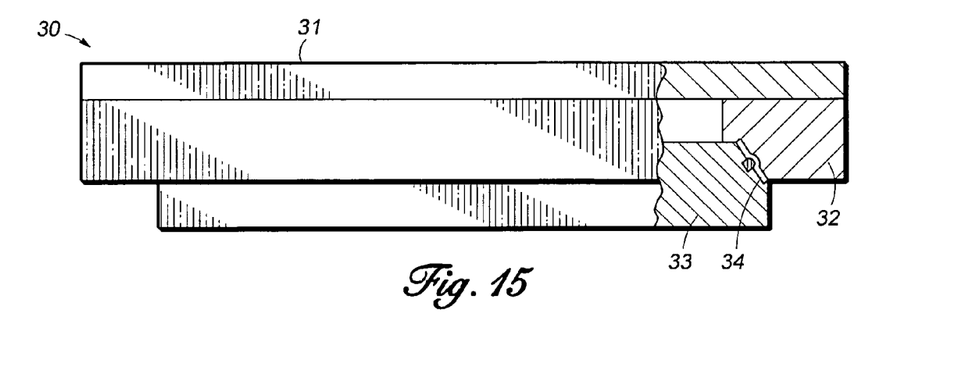
FIG. 15 is a plan partial sectional view of the metal stamping die, showing the forming cavity.

The metal band 11 is manufactured using a metal stamping die 30, as shown in FIG. 15. The die 30 has a holding plate 31, a female punch 32, and a male punch 33, with a forming cavity 34 separating them.

Figure 16:
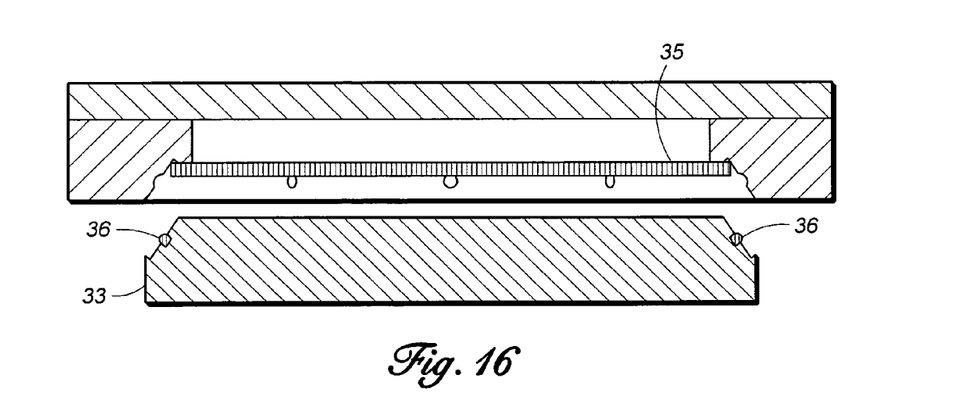
FIG. 16 is a sectional view of the cylindrical preform in the holding plate of the die.

As shown in FIG. 16, a cylindrical preform 35 has been cut and is ready to be stamped into its final form. Dimple-forming inserts 36 have been spaced around the surface of the male punch 33 at the forming cavity 34.

Figure 17:
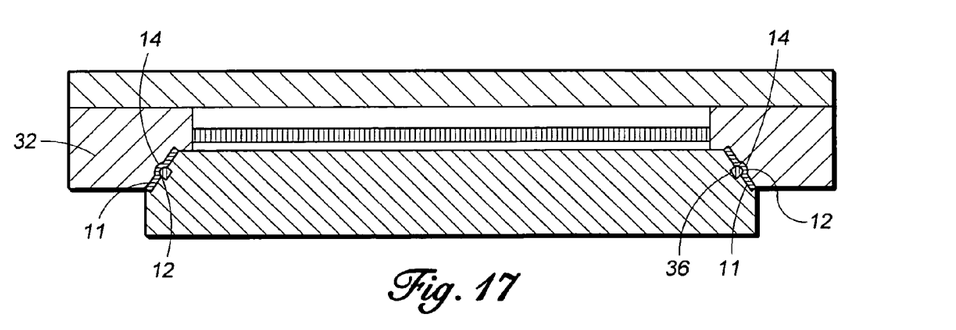
FIG. 17 is a sectional view of the metal band after it has been "stamped," with the forming inserts shaping the formation of dimples in the metal band.

As shown in FIG. 17, the female punch 32 has been lowered, and the metal band 11 stamped into its final form. The dimple-forming inserts 36 result in the formation of dimples 12/raised projections 14 in the stamped metal band 11.

Figure 18:
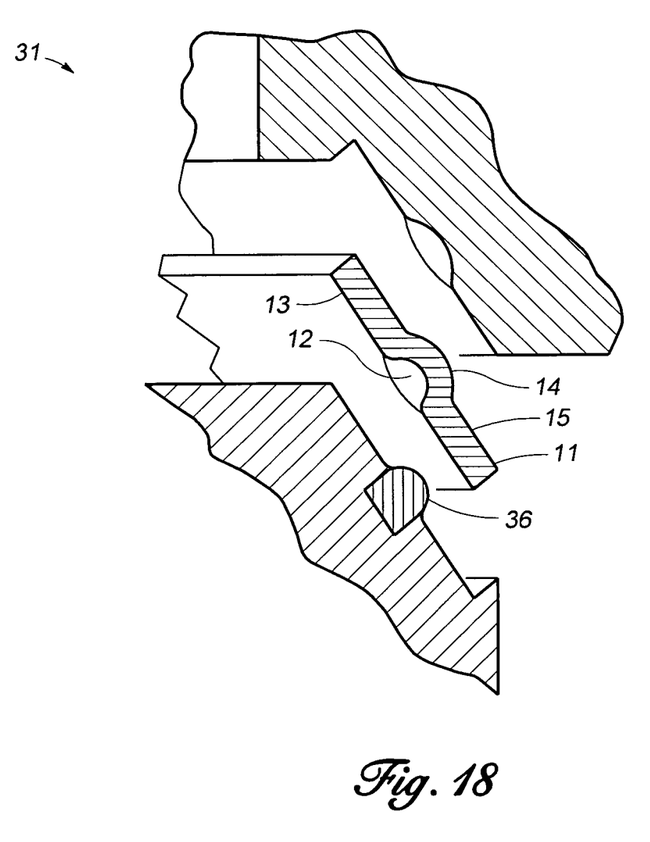
FIG. 18 is a detail sectional view of one of the dimples shaped by a forming insert placed on the male punch of the metal stamping die.

FIG. 18 shows the shape of the metal band 11 after it has been removed from the metal stamping die 31. The dimple-forming insert 36 has caused dimple 12 to form in the inner surface 13 of the metal band 11, raising raised projection 14 on the outer face 15 of the metal band 11.

I claim:

1. A method for manufacturing a reinforced gasket for use in sealing pipe joints, the method comprising the steps of:
    providing a slightly conical hoop-shaped metal band having an inner surface and an outer surface, the inner surface having a plurality of discrete spaced-apart dimples formed therein and the outer surface having a plurality of discrete raised projections, each of the projections corresponding to one of its dimples;
    providing a mold having complementary upper and lower mold plates, the mold plates, when assembled, defining a mold cavity for molding the reinforced gasket, the mold plates having inner walls;
    setting the metal band against the inner wall of the lower mold plate, the metal band spaced apart therefrom by the raised projections on the outer surface of the metal band;
    assembling and closing the upper and lower mold plates;
    injecting elastomeric material into the mold cavity, encapsulating both the inner surface and the outer surface of the metal band including the dimples and the raised projections prior to curing the reinforced gasket;
    curing the reinforced gasket; and
    removing the reinforced gasket from the mold.

2. The method of claim 1, wherein the metal band is formed from a metal selected from steel, copper, and brass.

3. The method of claim 1 wherein the elastomeric material is selected from the group consisting of synthetic rubber, natural rubber, and a thermoplastic material.

4. A method for manufacturing a reinforced gasket for use in sealing pipe joints, the method comprising the steps of:
    providing a slightly conical hoop-shaped metal band having a lower edge, an inner surface and an outer surface, the inner surface having a plurality of discrete spaced-apart dimples formed therein and the outer surface having a plurality of discrete raised projections, each of the projections corresponding to one of its dimples;
    providing a mold having complementary upper and lower mold plates, the mold plates, when assembled, defining a mold cavity for molding the reinforced gasket, the mold plates having inner walls and the mold cavity having a bottom with a circumference;
    arranging core support pins around, the circumference of the bottom of the mold cavity, each of the core support pins having a top;
    setting the lower edge of the metal band against the top of the core support pins, the metal band spaced apart from the inner wall of the lower mold plate by the raised projections on the outer surface of the metal band;
    assembling and closing the upper and lower mold plates;
    injecting elastomeric material into the mold cavity, encapsulating both the inner surface and the outer surface of the metal band including the dimples and the raised projections prior to curing the reinforced gasket;
    curing the reinforced gasket; and
    removing the reinforced gasket from the mold.

5. The method of claim 4, wherein the metal band is formed from a metal selected from steel, copper, and brass.

6. The method of claim 4 wherein the elastomeric material is selected from the group consisting of synthetic rubber, natural rubber, and a thermoplastic material.

\* \* \* \* \*